Sept. 29, 1970  E. NAZARE  3,531,709
REVERSIBLE ELECTROMECHANICAL CONVERTER AND
DEVICES INCORPORATING SAME
Filed Feb. 8, 1968  3 Sheets-Sheet 1

INVENTOR
EDGARD NAZARE
BY
Kenyon & Kenyon
ATTORNEYS

Sept. 29, 1970  E. NAZARE  3,531,709
REVERSIBLE ELECTROMECHANICAL CONVERTER AND
DEVICES INCORPORATING SAME
Filed Feb. 8, 1968
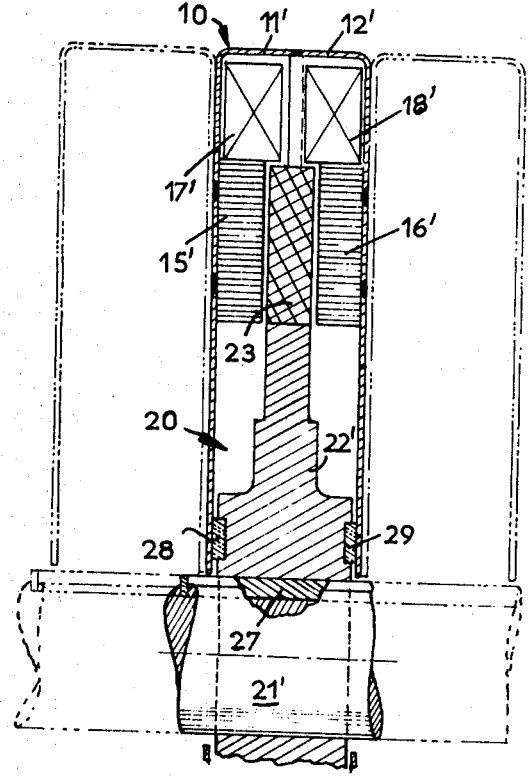
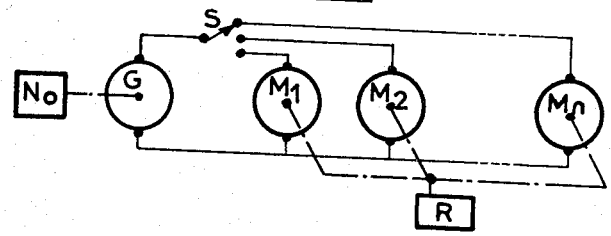
INVENTOR
EDGARD NAZARE

United States Patent Office 3,531,709
Patented Sept. 29, 1970

3,531,709
REVERSIBLE ELECTROMECHANICAL CONVERTER AND DEVICES INCORPORATING SAME
Edgard Nazare, 11 Avenue Gourgaud, Paris, France
Filed Feb. 8, 1968, Ser. No. 704,087
Claims priority, application France, Feb. 8, 1967, 94,188; Apr. 28, 1967, 104,751; May 22, 1967, 107,306
Int. Cl. H02m 7/00
U.S. Cl. 321—8                    15 Claims

ABSTRACT OF THE DISCLOSURE

An electromechanical reversible converter which comprises a rotor in the form of a disk carrying on its periphery a plurality of flat permanent magnets alternately polarized in opposite axial directions, and a stator carrying on each side of said rotor a plurality of angularly spaced pole pieces magnetically coupled to at least one electrical winding. The rotor is made to rotate step-by-step by applying to said winding electrical pulses of alternate polarities. Such a converter can be used in speed, position and/or force transmitting systems.

---

This invention relates to a reversible electromechanical converter comprising relatively movable parts, such as a stator and a rotor, acting upon each other through the intermediary of static magnetic fields.

A converter according to this invention is characterized in that one of the aforesaid parts includes a member in the shape of a linear strip or of a strip of revolution carrying on its opposite sides a regular sequence of permanent magnetic poles of alternate polarities, the other part carrying in front of each side of said member a plurality of pole-pieces disposed in regularly spaced relationship and magnetically coupled to at least one winding which receives or produces electrical pulses of alternate polarities whenever said parts move from one position of equilibrium to the next.

A converter according to this invention essentially differs from previously known similar devices, such as alternators, synchronous motors, selsyns or the like, in that it works with purely static magnetic fields instead of revolving fields, and in that it exhibits a plurality of equidistant equilibrium positions, in which it can rest without any electrical energization as a mere consequence of the law of maximal flux; the displacement from one equilibrium position to the next involves the reversal of the polarities of the pole-pieces, i.e. the presence of an electrical pulse; thus, the displacements of the converter movable part and the frequency of the electrical pulses are rigidly tied, so that non-periodic pulses correspond to a step by step displacement, whilst periodic pulses involve a substantially continuous displacement, owing to the inertia of the movable part.

According to another feature of this invention, the spacing of the converter pole-pieces is either equal to the spacing of the like poles on one side of the aforesaid member, or equal to a whole or fractional multiple, notably 2 or 3/2 of said last spacing.

According to a further feature of this invention, the aforesaid pole-pieces located on opposite sides of the aforesaid member are either disposed substantially in front of each other and of opposite polarities, or disposed in staggered relationship and of like polarity.

The numerous possible combinations of said geometrical features allow for an easy fitting of the distribution of the converter equilibrium positions to the specific applications contemplated.

According to still further features of this invention, either each aforesaid pole-piece is magnetically coupled to a respective winding, or several pole-pieces to a same winding, said windings being either electrically connected in series and/or in parallel, or electrically independent, in which case a switching device is advantageously associated to the converter.

These electrical features, in combination with the aforesaid geometrical features allow for the construction of converters having various working characteristics, such as rotation in a predetermined direction, self-rotation when fed by direct current, operation with single-phase or polyphase alternating current.

According to a preferred embodiment of a converter conformable with the present invention, the aforesaid member is built up by juxtaposing a plurality of substantially flat permanent magnets, which are individually or jointly attached to a common support member, the aforesaid pole-pieces being rigidly connected, as by welding, to a common armature made from sheet-metal or the like.

Advantageously, a converter according to this invention is in the form of a standard element designed for association with similar elements for building up a composite unit by mere juxtaposition of said elements.

This invention has also for its object the devices incorporating at least one aforesaid converter and notably the force or displacement transmitting devices, the servo-devices for remote control or telemetering, and the devices for remote-display or data processing.

Other features and advantages of this invention will appear more clearly from the following disclosure, which refers to the annexed drawings, on which:

FIG. 3 is a part-sectional view of another converter according to this invention, in the shape of a standard element;

FIGS. 5 and 6 are schematic diagrams of two force transmitting devices according to this invention.

Figure 1:
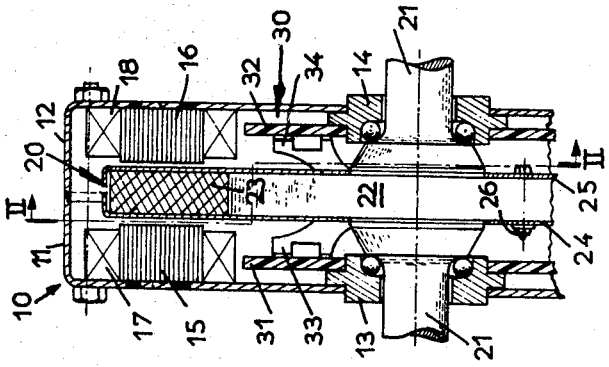
FIG. 1 is a part-sectional view of a converter according to a first embodiment of this invention.
Figure 2:
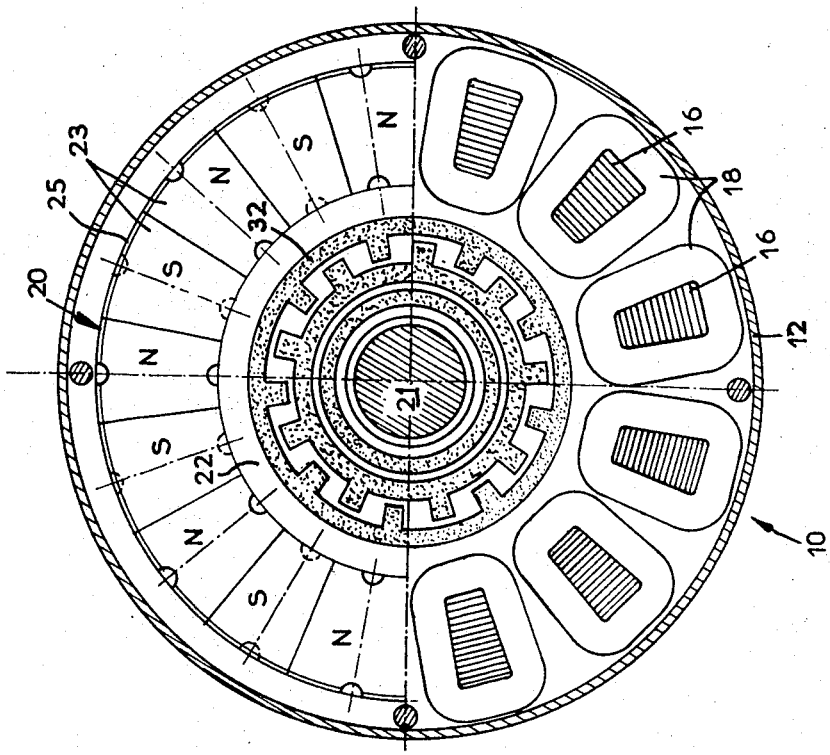
FIG. 2 is a section along line II—II of FIG. 1.

As shown on FIGS. 1 and 2, a converter according to a first embodiment of this invention comprises a stator 10, including an armature consisting of two stamped sheet-metal side-plates 11, 12 interlocked along their peripheral turned edges and each of which carries a central annular ring 13, 14 constituting the outer race of a ball bearing, of which the inner race is machined on the shaft 21 of rotor 20. Said rotor essentially consists of a flat disk 22 around which permanent magnets 23 of sectoral shape are juxtaposed so as to form a continuous ring and are maintained by means of two plates 24, 25 secured to the opposite sides of disk 22 by bolts 26 for instance. On either side of the magnets 23, the side-plates 11, 12 carry laminated pole-pieces 15, 16 of sectoral shape, angularly spaced at regular intervals along an imaginary ring confronting that built up by magnets 23; each aforesaid polar piece 15, 16 is provided with a respective winding 17, 18 operative for polarizing said pole-piece in either axial direction.

As shown on FIG. 2, the stator 10 carries twelve pairs of axially confronted pole-pieces 15, 16, whereas the rotor 20 comprises eighteen permanent magnets 23 of alternate polarities. This construction has for an advantage notably to provide for a predetermined direction of rotation of the rotor, assuming that a suitable switching device is associated to the converter for sequentially energizing its windings in synchronism with the rotor revolution; this switching device is either separated from or incorporated to the converter, according as to whether the rotation of the converter must be synchronized with the frequency of an electrical current, for instance supplied by another converter or must be free, in which case the converter rotates by itself and can be fed with direct current.

The converter shown on FIGS. 1 and 2 comprise such a switching device, designated by 30 in its whole, which essentially consists of two insulating disks 31, 32 fitted on the rings 13, 14 respectively, and the inner sides of which are provided with two printed circuits co-operating with a double brush 33, 34 carried by rotor 20; this arrangement provides for periodic reversal of the current feeding the windings 17, 18 in synchronism with the revolution of rotor 20. Of course, the angular position of the disks 31, 32 with respect to the stator 10, as well as the angular position of the brushes 33, 34 with respect to the rotor 20 are determined so that the polarities of the pole-pieces are inverted whenever the rotor passes by an equilibrium position.

Figure 4:
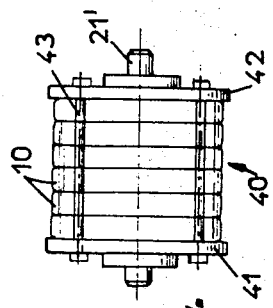
FIG. 4 is an outside view of a composite unit built up from several elements as shown on FIG. 3.

On FIG. 3 is shown in part-sectional view another example of embodiment of a converter according to this invention, which assumes the shape of a standard element designed for building up a composite unit as shown on FIG. 4 by mere juxtaposition with similar elements. The element shown on FIG. 3 comprises numerous members which are identical or similar to those of the converter shown on FIGS. 1 and 2, and which are consequently designated by the same reference numerals possibly with a prime affixed thereto.

The standard element shown on FIG. 3 comprises a stator disk the armature of which consists of two stamped sheet-metal side-plates 11', 12' interlocked along their confronted peripheral turned edges; on the inner faces of said side plates are secured respective pole-pieces 15', 16' disposed in staggered relationship on both sides of the rotor 20; said rotor consists of a flat disk 22' along which are disposed juxtaposed permanent mangets 23, secured to said disks as by cementing or brazing, said magnets being in equal number as the aforesaid pole-pieces 15', 16'. The disk 22' is mounted on a shaft 21' provided with a longitudinal key member 27, so that the rotor 20 is solid in rotation with the shaft, but is free for longitudinal displacement thereon. With a view to properly centering the magnets between the pole-pieces 15', 16', the disk 22' is provided on its opposite sides with annular slide rings 28, 29 engaging the inner faces of the side plates 11', 12', respectively. The pole-pieces 15', 16' located on opposite sides of the rotor 20 are polarized by respective annular windings 17', 18' connected in opposition so that said pole-pieces are simultaneously of like polarity.

As shown on FIG. 4, a composite unit 40 providing a high torque can be built up by merely juxtaposing on shaft 21' several standard elements similar to that shown and described, said elements being axially compressed between end-plates 41, 42 connected by tie-rods and distance pieces 43; the side-plates 11', 12' of each element being flat and extending parallelly, their building-up implies no particular problem, so that the construction of the composite unit 40 is readily effected. Advantageously, at least one of said elements pertains to the type comprising different numbers of poles on the stator and rotor, with a view to determining the direction of rotation of the other elements, which merely belong to the type having a like number of poles on the stator and rotor.

On FIG. 5 is diagrammatically shown a first example of a first force transmitting device according to the invention, suitable for substitution to a mechanical gearbox. This device comprises a constant or variable speed driving element $N_0$, to which is coupled a converter G acting as a generator, which is electrically connected, through the intermediary of a switching device S, to anyone of several converters $M_1, M_2 \ldots M_n$ having different numbers of poles and coupled to a same driven element R. Thus, the latter is always driven at a speed proportional to that of the driving element $N_0$, the speed ratio depending on the number of poles of generator G and of the converter M to which it is electrically connected by the switch means S.

Figure 6:
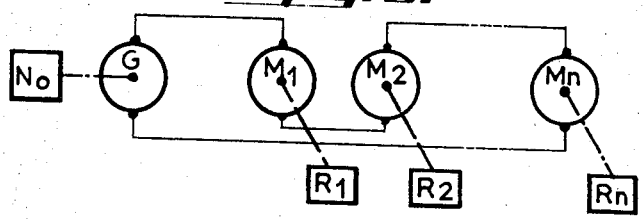

FIG. 6 is a schematic diagram of another embodiment of a force transmitting device according to this invention, which comprises a driving element $N_0$ coupled to a converter G acting as a generator, to which are electrically connected in series several converters $M_1, M_2 \ldots M_n$ having different numbers of poles and coupled to respective driven elements $R_1, R_2 \ldots R_n$. Thus, any angular displacement of the driving element $N_0$ causes proportional angular displacements of the driven elements $R_1, R_2 \ldots R_n$ differing from each other. Such a device may be used for transmitting torques, in which case it is equivalent to a multiple-output mechanical harness, or for indexing the angular positions of several members, for instance in a remote control or display system or in a data register.

Figure 7:
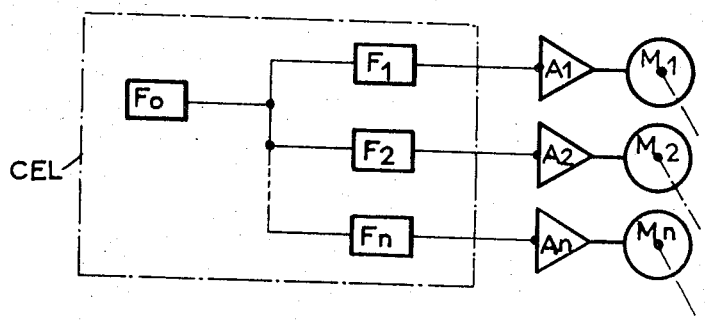
FIGS. 7, 8 and 9 are schematic diagrams of three servo-devices according to this invention, which incorporate a control unit of electronic, electromechanical and photoelectrical nature, respectively.
Figure 8:
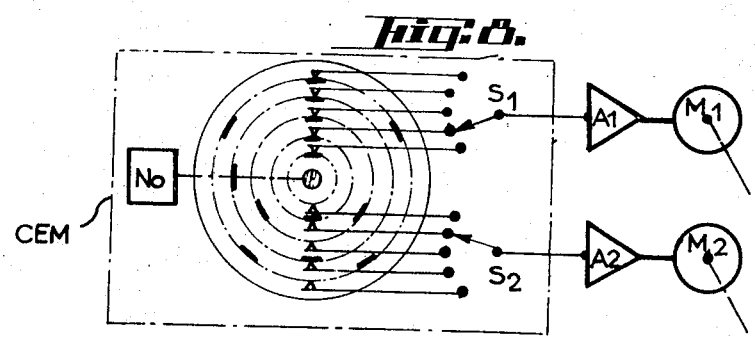
Figure 9:
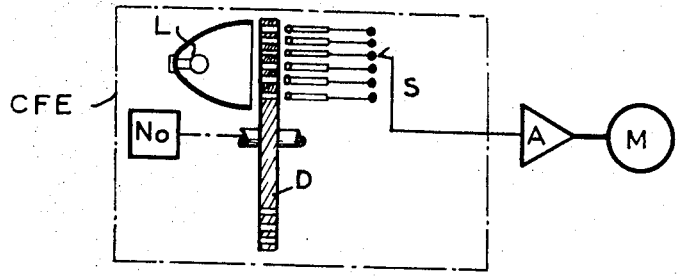

On FIGS. 7, 8 and 9 are shown three servo-devices according to this invention, each of which includes a pulse generator having a determined recurrence frequency, which controls through the intermediary of switching and/or amplifyin gmeans the rotation of at least one converter according to this invention.

In the embodiment shown on FIG. 7, said pulse generator consists of an electronic control device CEL comprising a constant or variable frequency generator $F_0$ connected to a plurality of frequency dividers or multipliers $F_1, F_2 \ldots F_n$ the outputs of which control respective amplifiers $A_1, A_2 \ldots A_n$ each of which delivers to an associated converter $M_1, M_2 \ldots M_n$ a high intensity alternating current, consisting preferably of pulses. Thus, the speeds of rotation of the various converters are function of their respective numbers of poles, of the frequency of generator $F_0$, and of the frequency-dividing or multiplying ratio of the concerned element $F_1, F_2 \ldots F_n$.

FIG. 8 is a schematic diagram of another servo-device according to this invention, fitted with an electromechanical control unit CEM. This unit merely consists of a disk rotated at constant or variable speed by a motor $N_0$ and provided with a plurality of concentrically disposed tracks, each of which includes a determined number of electrically conductive areas in equidistant relationship, said areas being all connected to a same terminal. In correspondence with the aforesaid tracks are provided two sets of brushes, each connected to a respective selector $S_1, S_2$, associated with an amplifier $A_1, A_2$ feeding a respective converter $M_1, M_2$. Said converters rotate consequently each at a speed proportional to the number of conductive areas of the selected track, to the speed of rotation of the motor $M_0$, and to the reciprocal of the number of poles of the converter itself. Of course, in lieu of the disk as shown, a drum could be used, whereas contactors actuated by cams carried by said disk or drum could be substituted for the brushes as shown.

On FIG. 9 is diagrammatically shown a third servo-device according to this invention, which comprises a photoelectric control unit CFE. This unit essentially consists of a disk D rotated by a motor $N_0$ and provided with angularly equidistant sets of perforations in concentric relationship; on opposite sides of the disk D are respectively disposed a light source L and a set of photosensitive elements, which are connected through the intermediary of a selector S to an amplifier A feeding the converter M. The speed of revolution of said converter is obviously proportional to that of motor $N_0$, their ratio being determined by the number of perforations of the disk passing by the concerned photosensitive element, and by the number of poles of the converter.

What I claim is:

1. An electromechanical reversible converter, comprising a stator and rotor as relatively movable parts acting upon each other throug hthe intermediary of static magnetic fields, characterized in that one of said parts includes a strip member presenting on each of its opposite sides a regular sequence of permanent magnetic poles of alternate polarities, the other part carrying in front of each side of said strip member a plurality of pole-pieces disposed in regularly spaced relationship and at least one electrical winding magnetically coupled to said pole pieces through which winding flow electrical pulses of alternate polarities whenever said parts move from one position of equilbrium to the next.

2. A converter according to claim 1, characterized in that spacing of said pole-pieces is equal to a whole multiple of the spacing of the like magnetic poles on the corresponding side of said strip member.

3. A converter according to claim 1, characterized in that the spacing of said pole-pieces is equal to a fractional multiple, notably 3/2, of the spacing of the like magnetic poles on the corresponding side of said strip member.

4. A converter according to claim 1, characterized in that said pole-pieces located on opposite sides of said strip member are disposed substantially in front of each other and are of opposite magnetic polarities.

5. A converter according to claim 1, characterized in that said pole-pieces located on opposite sides of said strip member are disposed in staggered relationship and are of like polarity.

6. A converter according to claim 1, characterized in that each aforesaid pole-piece is magnetically coupled to at least one respective electrical winding.

7. A converter according to claim 1, characterized in that several aforesaid pole-pieces are magnetically coupled to a same electrical winding.

8. A converter according to claim 1, characterized in that it comprises several electrical windings operatively connected to one another.

9. A converter according to claim 1, characterized in that it comprises associated switching devices and several independent electrical windings operatively connected to an associated switching device.

10. A converter according to claim 1, characterized in that it comprises a common support member and wherein said strip member of said one part is built up by juxtaposing a plurality of substantially flat permanent magnets carried by said common support member.

11. A converter according to claim 1, characterized in that it comprises a common armature, the aforesaid pole-pieces being rigidly connected by welding to said common armature which is made of sheet-metal.

12. A converter according to claim 1, characterized in that it is in the form of a standard element adapted to be associated with similar elements for building up a composite unit by mere juxtaposition of such elements.

13. An electromechanical transmission device, characterized in that it comprises at least two aforesaid converters according to claim 1 and driving and driven mechanical units to which said converters are respectively coupled.

14. An electromechanical transmission device according to claim 13, characterized in that it comprises several converters having different numbers of poles coupled to one of said mechanical units, an electrical switching device, said converters being selectively connected through said electrical switching device to at least one further converter coupled to the other of said mechanical units.

15. A servo-device, characterized in that it comprises at least one aforesaid converter according to claim 1 and a variable frequency pulse generator, the displacement of the movable part of said converter being controlled by said variable frequency pulse generator.

References Cited

UNITED STATES PATENTS

| | | | |
|---|---|---|---|
| 2,564,320 | 8/1951 | Brainard | 322—46 |
| 3,078,409 | 2/1963 | Bertsche, et al. | 321—8 |
| 3,411,027 | 11/1968 | Rosenberg | 310—181 |

WILLIAM M. SHOOP, Jr., Primary Examiner

U.S. Cl. X.R.

321—48, 62; 310—181